(12) United States Patent
Kobayashi et al.

(10) Patent No.: US 12,282,297 B2
(45) Date of Patent: Apr. 22, 2025

(54) TIMEPIECE DIAL AND TIMEPIECE

(71) Applicant: Seiko Epson Corporation, Tokyo (JP)

(72) Inventors: Atsushi Kobayashi, Shiojiri (JP); Yuki Hibi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 723 days.

(21) Appl. No.: 17/467,540

(22) Filed: Sep. 7, 2021

(65) Prior Publication Data
US 2022/0075321 A1    Mar. 10, 2022

(30) Foreign Application Priority Data
Sep. 8, 2020   (JP) ................ 2020-150392

(51) Int. Cl.
| | |
|---|---|
| G04B 19/06 | (2006.01) |
| G02B 5/20 | (2006.01) |
| G04B 19/10 | (2006.01) |
| G04B 45/00 | (2006.01) |
| G04C 10/02 | (2006.01) |

(52) U.S. Cl.
CPC ............ *G04B 19/06* (2013.01); *G02B 5/201* (2013.01); *G04B 19/10* (2013.01); *G04B 45/0015* (2013.01); *G04C 10/02* (2013.01)

(58) Field of Classification Search
CPC .... G04B 19/06; G04B 45/0015; G04B 19/10; G04C 10/02; G02B 5/201
See application file for complete search history.

(56) References Cited

U.S. PATENT DOCUMENTS

| | | | | |
|---|---|---|---|---|
| 2,885,561 | A  * | 5/1959 | Lange | G04B 19/32 |
| | | | | 968/215 |
| 8,758,884 | B2 * | 6/2014 | Hiroe | G04B 19/10 |
| | | | | 368/239 |
| 8,879,369 | B2 * | 11/2014 | Takasawa | G04B 19/10 |
| | | | | 368/205 |
| 2003/0016315 | A1 * | 1/2003 | Ueno | G04G 9/0041 |
| | | | | 349/66 |
| 2008/0123473 | A1 * | 5/2008 | Ozawa | G04G 9/00 |
| | | | | 368/80 |
| 2014/0029392 | A1 | 1/2014 | Takasawa | |
| 2017/0038743 | A1 | 2/2017 | Sawada | |
| 2021/0255587 | A1 | 8/2021 | Saito | |

FOREIGN PATENT DOCUMENTS

| | | |
|---|---|---|
| JP | H09-325190 A | 12/1997 |
| JP | 2000-111674 A | 4/2000 |
| JP | 2007-224331 A | 9/2007 |
| JP | 2008-157833 A | 7/2008 |
| JP | 2009-244107 A | 10/2009 |
| JP | 2010-185722 A | 8/2010 |

(Continued)

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

A timepiece dial includes a substrate having transmissivity and two or more types of transmissive color films provided at one surface of the substrate, in which the two or more types of transmissive color films do not overlap with each other in plan view as viewed from a direction perpendicular to the one surface of the substrate.

18 Claims, 9 Drawing Sheets

(56) References Cited

FOREIGN PATENT DOCUMENTS

| | | |
|---|---|---|
| JP | 2012-145472 A | 8/2012 |
| JP | 2014-025901 A | 2/2014 |
| JP | 2014-134419 A | 7/2014 |
| JP | 2017-036960 A | 2/2017 |
| JP | 2019-060721 A | 4/2019 |
| JP | 2019-128306 A | 8/2019 |
| JP | 2019-158624 A | 9/2019 |
| JP | 2020-016573 A | 1/2020 |
| JP | 2020-030215 A | 2/2020 |

\* cited by examiner

TIMEPIECE DIAL AND TIMEPIECE

The present application is based on, and claims priority from JP Application Serial Number 2020-150392, filed on Sep. 8, 2020, the disclosure of which is hereby incorporated by reference herein in its entirety.

BACKGROUND

1. Technical Field

The present disclosure relates to a timepiece dial and a timepiece.

2. Related Art

JP-A-2010-185722 discloses a timepiece dial in which a pigment-colored film having optical transparency is provided at one surface of a substrate made out of a material having optical transparency, and a metal film is provided at the other-side surface. This dial is configured such that the metal film has a sufficiently small thickness to allow part of incident light to pass through. This configuration allows the dial to be used as a dial for a timepiece having a solar cell.

The pigment-colored film for the dial is a single layer, and the color of the dial is a single color. This causes limitation on development of the design of the dial.

When a plurality of color films are layered to develop the design of the dial, the light transmittance deteriorates.

SUMMARY

A timepiece dial according to the present disclosure includes a substrate having transmissivity, and two or more types of transmissive color films provided at one surface of the substrate, in which the two or more types of transmissive color films do not overlap with each other in plan view as viewed from a direction perpendicular to the one surface of the substrate.

A method of manufacturing a timepiece dial according to the present disclosure includes placing a second mask member in a second region of one surface of a substrate having transmissivity, forming a first transmissive color film in a first region other than the second region of the one surface, removing the second mask member from the substrate, placing a first mask member on the first transmissive color film, forming a second transmissive color film in the second region, and removing the first mask member from the first transmissive color film.

A timepiece according to the present disclosure includes the timepiece dial and a solar panel disposed at a back surface side of the timepiece dial.

DESCRIPTION OF EXEMPLARY EMBODIMENTS

First Embodiment

Below, a timepiece 1 according to a first embodiment will be described with reference to the drawings.

The timepiece 1 is a chronograph timepiece including a plurality of display functions of a 24-hour display, a date display, a second chronograph display, and a minute chronograph display, in addition to a typical 12-hour display using each of hour, minute, and second hands.

Figure 1:
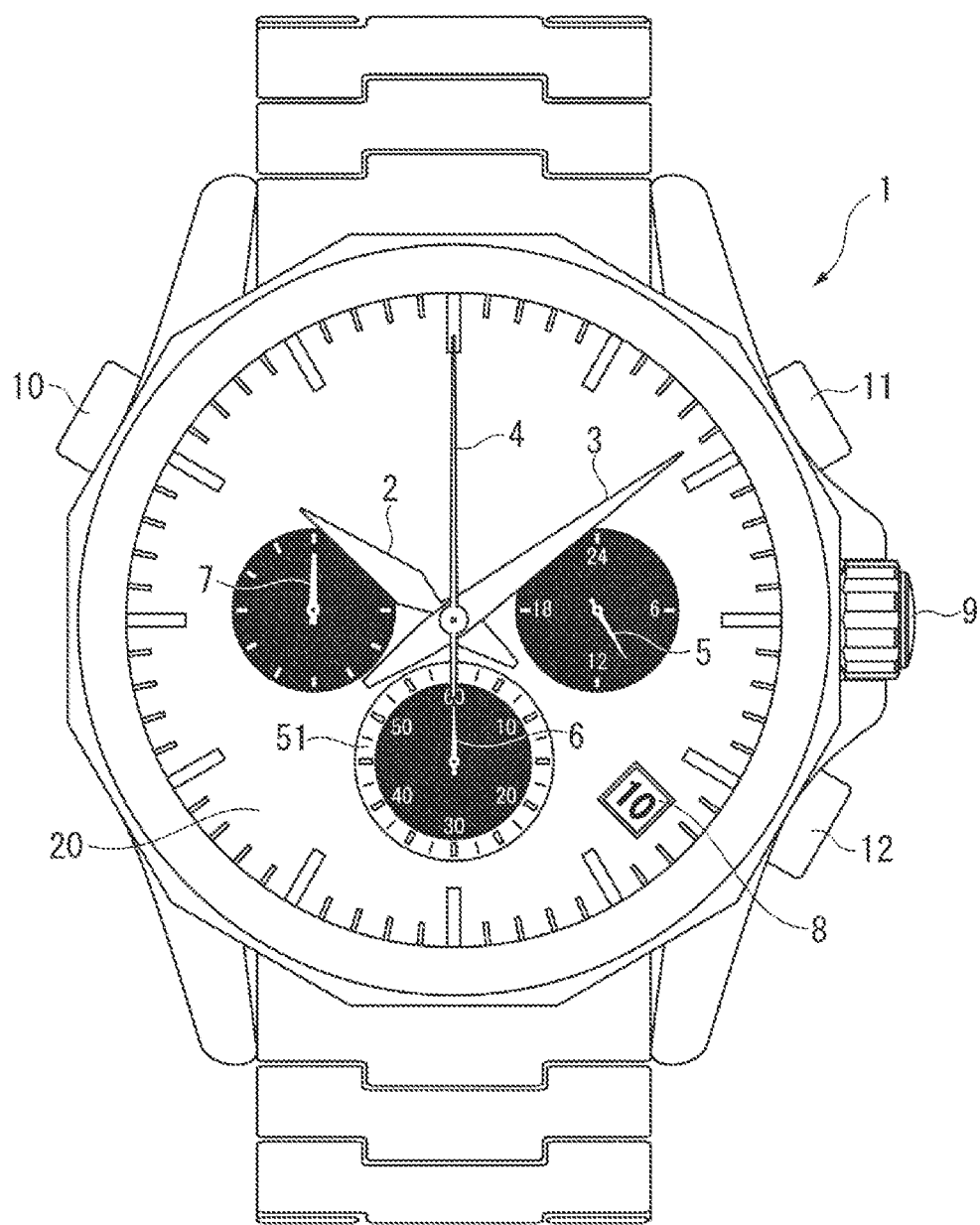
FIG. 1 is a front view illustrating a timepiece according to a first embodiment.

As illustrated in FIG. 1, the timepiece 1 includes: an hour hand 2, a minute hand 3, and a second hand 4 used to display the time in a 12-hour format; a 24-hour hand 5 used to display the time in a 24-hour format; a second CG hand 6 used for second chronograph display; a minute CG hand 7 used for minute chronograph display; a date indicator 8 used to display the date; and a timepiece dial 20. The timepiece 1 includes a crown 9, an A-button 10, a B-button 11, and a C-button 12 each serving as an operation member.

In addition, although illustration is not given, the timepiece 1 includes a solar panel disposed at a back surface side of the timepiece dial 20, a rechargeable battery configured to accumulate electric power generated by the solar panel, and a plurality of stepping motors driven by the electric power from the rechargeable battery.

Timepiece Dial

Figure 2:
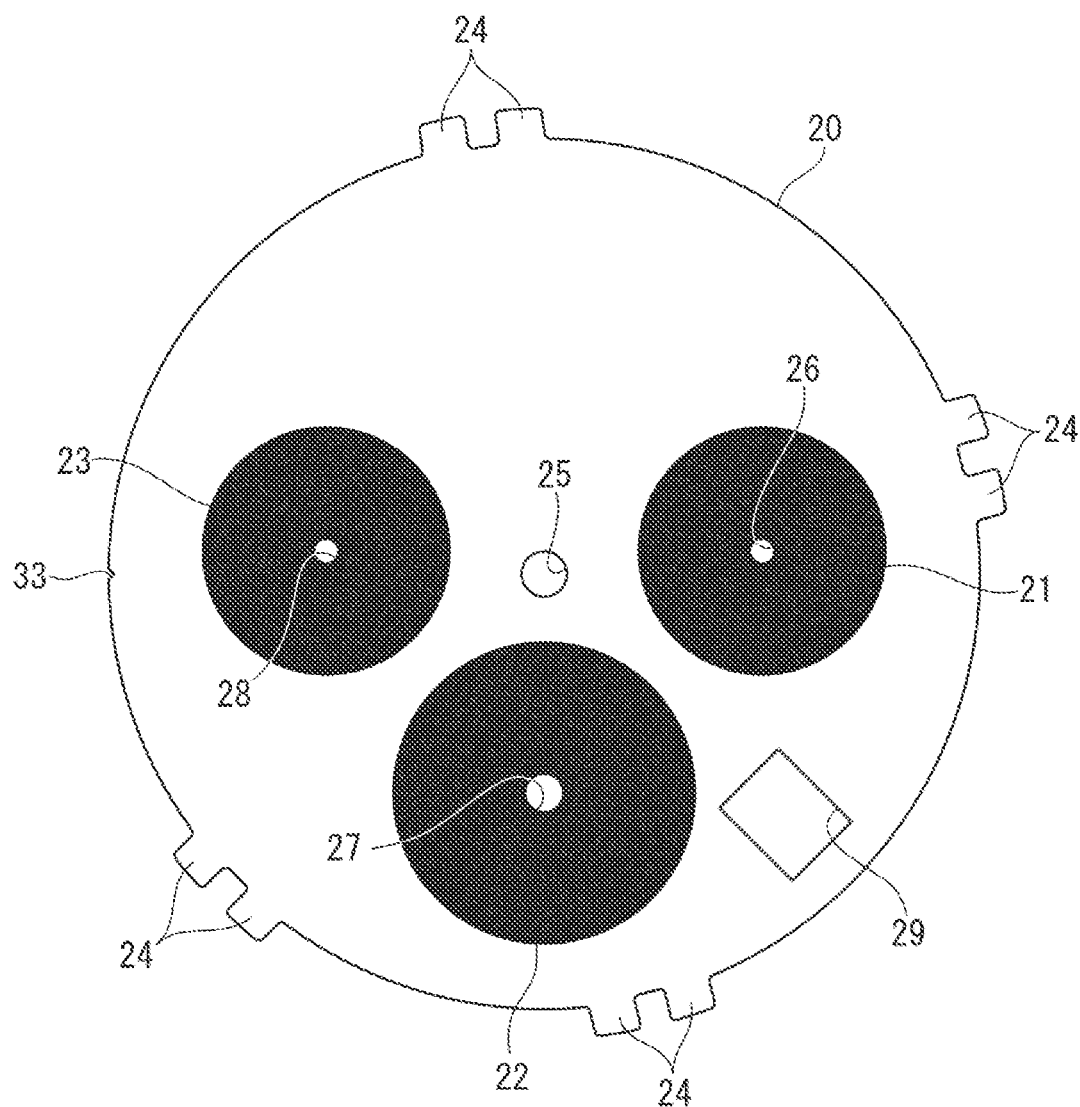
FIG. 2 is a plan view illustrating a timepiece dial according to the first embodiment.
Figure 3:
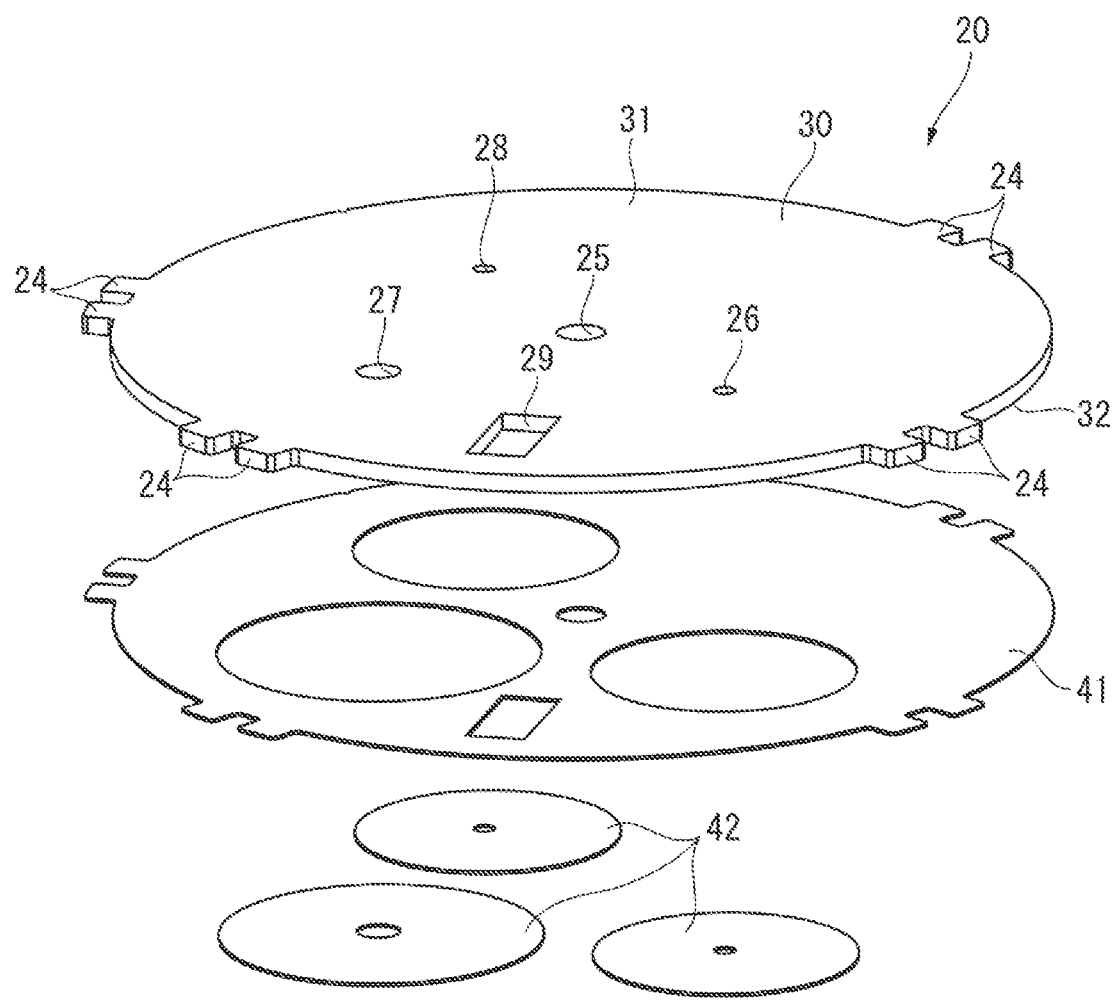
FIG. 3 is an exploded perspective view illustrating the timepiece dial according to the first embodiment.
Figure 4:
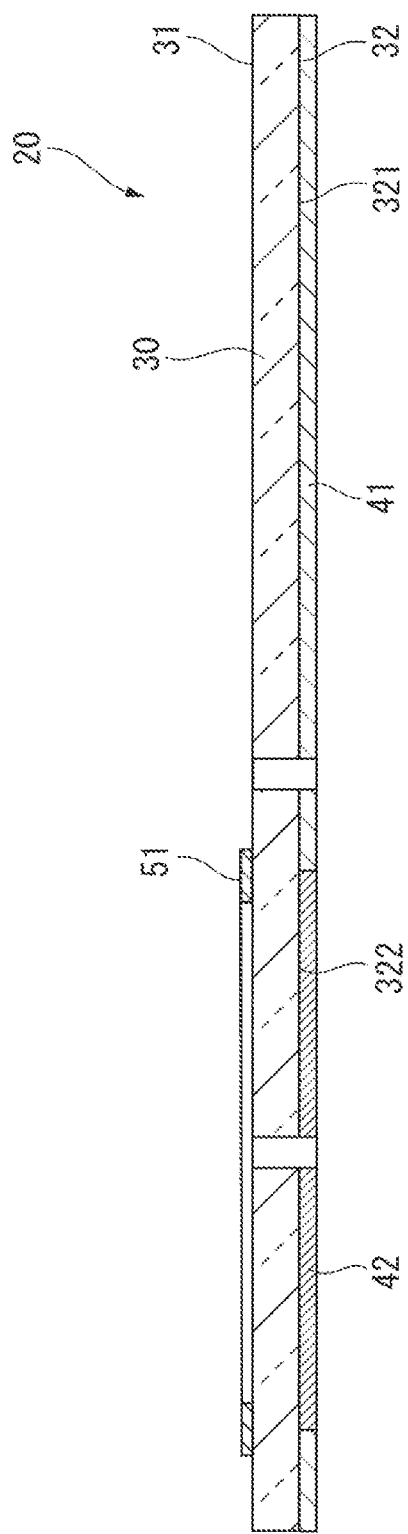
FIG. 4 is a cross-sectional view illustrating the timepiece dial according to the first embodiment.

Next, the timepiece dial 20 will be described with reference to FIGS. 2 to 4. FIG. 2 is a plan view illustrating the timepiece dial 20. FIG. 3 is an exploded perspective view illustrating the timepiece dial 20. FIG. 4 is a cross-sectional view illustrating the timepiece dial 20.

As illustrated in FIG. 2, a first sub-dial 21 having a flat round shape is provided in a substantially 3-o'clock direction relative to the center of the flat surface of the timepiece dial 20. A second sub-dial 22 having a flat round shape is provided in a 6-o'clock direction. A third sub-dial 23 having a flat round shape is provided in a substantially 9-o'clock direction.

Protrusions 24 used for attachment to a case of the timepiece 1 or the like are formed at the outer periphery of the timepiece dial 20.

A through hole 25 is formed at the center of the flat surface of the timepiece dial 20. In the through hole 25, hand shafts for the hour hand 2, the minute hand 3, and the second hand 4 are disposed.

A through hole 26 is formed at the center of the flat surface of the first sub-dial 21. In the through hole 26, a hand shaft for the 24-hour hand 5 is disposed. A through hole 27 is formed at the center of the flat surface of the second sub-dial 22. In the through hole 27, a hand shaft for the second CG hand 6 is disposed. A through hole 28 is formed at the center of the flat surface of the third sub-dial 23. In the through hole 28, a hand shaft for the minute CG hand 7 is disposed.

A date window 29 having a rectangle flat shape and used to visually recognize the date indicator 8 is formed in a substantially 4-o'clock direction relative to the center of the flat surface of the timepiece dial 20.

The timepiece 20 includes a substrate 30 having transmissive, and two or more types of transmissive color films provided at one surface of the substrate 30. In this embodiment, a first transmissive color film 41 and a second transmissive color film 42 that have colors different from each other are provided as the two or more types of transmissive color films. That is, it is only necessary that the two or more types of transmissive color films are set so as to be able to be recognized as different colors by a user when the user visually recognizes the timepiece dial 20. In addition, it is only necessary that individual transmissive color films are films that differ at least in colors.

The substrate 30 includes a front surface 31 that is formed in a substantially disk shape and is opposed to a cover glass of the timepiece 1, and also includes a back surface 32 that is opposed to a solar panel. In this embodiment, the back surface 32 is set as the one surface of the substrate 30 at which the two or more types of transmissive color films are provided.

A V-shaped positioning groove 33 is provided at a position of 9 o'clock at the outer periphery of the substrate 30, as illustrated in FIG. 2.

The substrate 30 is made out of a material having transmissive, in other words, having a property that allows light to pass through. In this embodiment, the "having transmissive" means having a property that allows at least part of light having a wavelength that falls in a visible light range of 380 nm to 780 nm. Preferably, the transmittance of light in the visible light range is equal to or more than 508. More preferably, the transmittance of light in the visible light range is equal to or more than 60%.

As the light transmittance of the substrate 30 increases, it is possible to increase the amount of light that passes through the first transmissive color film 41 and the second transmissive color film 42 and reaches the solar panel, which makes it possible to increase the amount of electric power generated by the solar panel.

The material of the substrate 30 includes various types of plastic, various types of glass materials, and the like. For example, it is possible to use polycarbonate. That is, a material for a dial used in a timepiece having a solar panel can also be used for the substrate 30.

Although illustration is not given, the timepiece 1 includes a movement including a plurality of stepping motors for time display, a plurality of stepping motors for chronograph, and a gear train. The stepping motor is a single phase bipolar stepping motor.

The first transmissive color film 41 and the second transmissive color film 42 are provided at the back surface 32 of the substrate 30.

The first transmissive color film 41 and the second transmissive color film 42 are provided so as not to overlap with each other in plan view of the substrate 30. Note that the plan view of the substrate 30 means viewing the substrate 30 from a direction perpendicular to the front surface 31 or the back surface 32 of the substrate 30, in other words, from an axial direction of the hand shafts of the hour hand 2, the minute hand 3, and the second hand 4. Note that the "first transmissive color film 41 and the second transmissive color film 42 are provided so as not to overlap with each other in plan view of the substrate 30" includes the following two states. The first one is a state in which a space exists at a boundary portion between the first transmissive color film 41 and the second transmissive color film 42 in plan view of the substrate 30. The other one is a state in which the boundary portion is in contact. That is, it is only necessary that the first transmissive color film 41 and the second transmissive color film 42 are configured so as not to overlap with each other in plan view of the substrate 30.

In this embodiment, as illustrated in FIG. 4, the first transmissive color film 41 is provided in a first region 321 of the back surface 32, and the second transmissive color film 42 is provided in a second region 322 of the back surface 32.

The second region 322 is a region that overlaps with the first sub-dial 21, the second sub-dial 22, and the third sub-dial 23 in plan view. The first region 321 is a region other than the second region 322.

The first transmissive color film 41 and the second transmissive color film 42 are provided by applying, on the back surface 32, a paint having transmissive and having a property that allows light to pass through. That is, the first transmissive color film 41 and the second transmissive color film 42 are made of a paint having transmissive that can be applied on the substrate 30. For example, an acrylic-based paint, a urethane-based paint, a lacquer paint, or the like can be used.

The first transmissive color film 41 and the second transmissive color film 42 are films that differ in colors added with a pigment included in a transparent acrylic resin, and have a function of reflecting light having a color corresponding to the included pigment and a function of allowing part of light to pass through. This enables the timepiece dial 20 to display different colors between the first region 321 in which the first transmissive color film 41 is provided and the second region 322 in which the second transmissive color film 42 is provided. In this embodiment, the first transmissive color film 41 is formed with a white paint, and the second transmissive color film 42 is formed with a black paint. Note that each of the transmissive color films may be colored using a dye rather than a pigment or may be colored using a combination of a pigment and a dye. Alternatively, it may be possible to use metal powder to add a color.

The light transmittance of the first transmissive color film 41 is set to be higher than the transmittance of the second transmissive color film 42. The area of the first transmissive color film 41 is set to be larger than the area of the second transmissive color film 42. This makes it possible to cause light that has passed through the substrate 30 and the first transmissive color film 41 or the second transmissive color film 42 to enter the solar panel, and to generate electric power using the solar panel.

A decoration member is glued on the front surface 31 of the substrate 30. Specifically, an indicator ring 51 serving as the decoration member and indices comprised of numbers indicating chronograph seconds are glued in a portion of the second sub-dial 22. Note that the indicator ring 51 may be a metal ring, or may be configured by applying a coating on the front surface 31 of the substrate 30.

The indicator ring 51 is disposed so as to cover the boundary portion between the second transmissive color film 42 applied on the second sub-dial 22 and the first transmissive color film 41 applied on the surrounding of the second sub-dial 22. That is, as illustrated in FIG. 4 that is a cross-sectional view taken along the line connecting the position of 12 o'clock and the position of 6 o'clock of the timepiece dial 20, the indicator ring 51 is disposed so as to extend across the first transmissive color film 41 and the second transmissive color film 42 in plan view of the substrate 30.

The indices are glued along the inner periphery of the indicator ring 51 in the second sub-dial 22. Specifically, as illustrated in FIG. 1, six pieces of numbers of indices "10, 20, 30, 40, 50, and 60" are glued.

The numbers "6, 12, 18, and 24" and the indices of markings are glued at four respective locations of the first sub-dial 21. Indices of markings are glued at 12 locations of the third sub-dial 23.

Process of Painting Substrate

Figure 5:
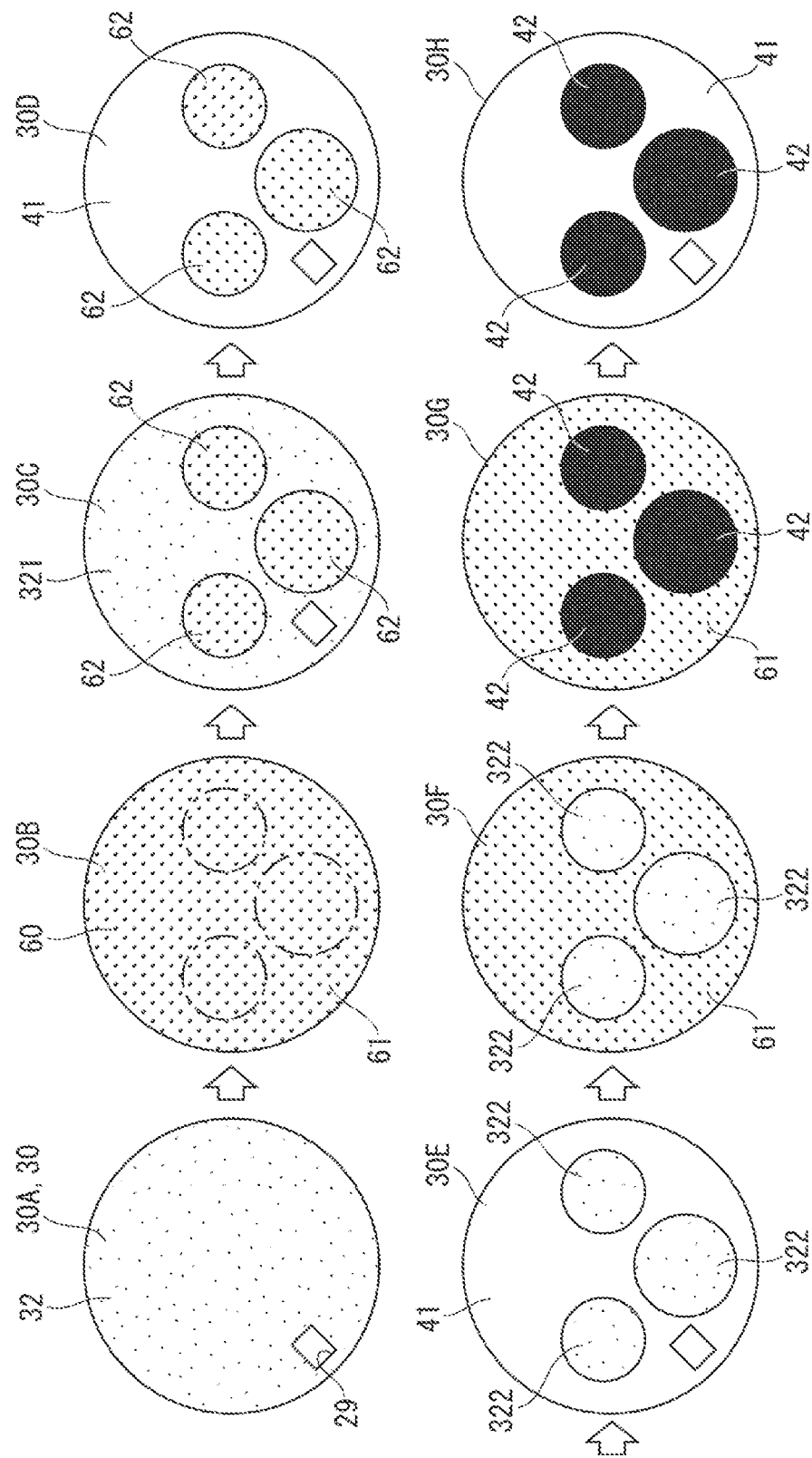
FIG. 5 is a process diagram illustrating a process of painting the timepiece dial according to the first embodiment.

Next, a process of applying a painting of the first transmissive color film 41 and the second transmissive color film 42 on the substrate 30 will be described with reference to FIG. 5. Note that FIG. 5 is a process explaining diagram used to explain a process of painting. The substrate 30 illustrated in FIG. 5 is illustrated as a schematic view. This view does not illustrate a through hole through which each of the hand shafts is inserted or the like.

In this embodiment, the first transmissive color film 41 and the second transmissive color film 42 are provided at the back surface 32 of the substrate 30. Thus, at the time of performing the painting work, the substrate 30 is flipped over to cause the back surface 32 to be the front side as with the substrate 30A in FIG. 5, and is placed on a work bench or the like.

Next, a mask 60 is glued on the back surface 32 as with a substrate 30B in FIG. 5. The mask 60 is a masking sheet used to cover a portion other than the paint region to protect it at the time of painting of the first transmissive color film 41 or the second transmissive color film 42. The mask 60 according to this embodiment includes a sheet obtained by stacking a removable adhesive on the back side of a metal film comprised of a metal plating or the like. In addition, the mask 60 is configured so as to be able to be separated into a first mask member 61 and a second mask member 62. The first mask member 61 corresponds to a region other than the individual sub-dials 21, 22, and 23. The second mask member 62 corresponds to a region of the individual sub-dials 21, 22, and 23.

Note that the mask 60 can be positioned relative to the substrate 30 such that a mark or a notch provided on the mask 60 is aligned with the V-shaped positioning groove 33 at the outer periphery of the substrate 30.

Next, the first mask member 61 of the mask 60 is peeled off to be removed from the back surface 32 of the substrate 30 using a pair of tweezers or jig to obtain a state in which only the second mask member 62 is attached and the first region 321 is exposed as with a substrate 30C in FIG. 5.

Next, the first transmissive color film 41 is applied on the first region 321 exposed at the back surface 32, as with a substrate 30D in FIG. 5. The first transmissive color film 41 is a white paint as described above, and is applied using spray toward the back surface 32. At this time, the number of times of or the time duration of spray is controlled to adjust the film thickness of the first transmissive color film 41 to be, for example, approximately 30 μm, and also to achieve a predetermined value, for example, approximately 30% of the light transmittance of the first transmissive color film 41.

Next, the second mask member 62 is peeled off to be removed from the back surface 32 using a pair of tweezers or a jig to obtain a state in which the second region 322 is exposed as with a substrate 30E in FIG. 5.

Next, as with a substrate 30F in FIG. 5, the positioning groove 33 at the outer periphery of the substrate 30 is used as a reference to position the first mask member 61, and glue it. This brings a state of the substrate 30F in which the first region 321 is covered with the first mask member 61, and the second region 322 corresponding to each of the sub-dials 21, 22, and 23 is exposed.

Next, as with a substrate 30G in FIG. 5, the second transmissive color film 42 is applied on the second region 322 exposed at the back surface 32. The second transmissive color film 42 is a black paint as described above, and is applied using spray toward the back surface 32. At this time, the number of times of or the time duration of spray is controlled to adjust the film thickness of the second transmissive color film 42 to be, for example, approximately 30 μm, and also to set the light transmittance of the second transmissive color film 42.

Note that, in general, when both the first transmissive color film 41 that is a white paint film and the second transmissive color film 42 that is a black paint film have the same film thickness, the light transmittance of the first transmissive color film 41 is higher than the light transmittance of the second transmissive color film 42. In this embodiment, the first transmissive color film 41 and the second transmissive color film 42 are controlled so as to have approximately the same film thickness. Thus, the light transmittance of the first transmissive color film 41 is set to be higher than the light transmittance of the second transmissive color film 42.

Next, as with a substrate 30H in FIG. 5, the first mask member 61 is peeled off to be removed from the back surface 32 using a pair of tweezers or a jig. Thus, the first transmissive color film 41 is applied on the first region 321 of the back surface 32 of the substrate 30, and the second transmissive color film 42 is applied on the second region 322. This makes it possible to manufacture the timepiece dial 20 in which the first transmissive color film 41 and the second transmissive color film 42 do not overlap with each other in plan view of the substrate 30.

Then, an adhesive is used to attach the indicator ring 51 or the indices on the front surface 31 of the substrate 30. Thus, the timepiece dial 20 completes.

Operation and Effects of First Embodiment

The timepiece dial 20 is configured such that the first transmissive color film 41 is provided in the first region 321 and the second transmissive color film 42 is provided in the second region 322. This makes it possible to provide two types of color films on the timepiece dial 20. This improves the design. In particular, the two types of color films have different colors, which makes it possible to improve the design using a combination of colors.

In addition, the first transmissive color film 41 and the second transmissive color film 42 are provided so as not to overlap with each other in plan view of the substrate 30. This makes it possible to improve optical transparency as compared with a case where individual color films are provided so as to overlap with each other. Furthermore, as individual color films do not overlap with each other, it is possible to prevent color from overlapping with each other and resulting in an interference color. This makes it possible to reproduce a desired color tone. Yet furthermore, as individual color films do not overlap with each other, it is possible to sharpen the boundary of color separation.

The timepiece dial 20 is configured such that the first transmissive color film 41 is provided in the first region 321 other than the sub-dials 21, 22, and 23, and the second transmissive color film 42 is provided in the second region 322 of the sub-dials 21, 22, and 23. This makes it possible to provide two types of color films in keeping with the design of the timepiece dial 20, which makes it possible to improve the design. Thus, it is possible to increase the range of decoration variation for a multi-shaft dial having a hand shaft at each portion of the sub-dials 21, 22, and 23.

The light transmittance of the first transmissive color film 41 is higher than the light transmittance of the second transmissive color film 42. In addition, the area of the first region 321 in which the first transmissive color film 41 is provided is larger than the area of the second region 322 in which the second transmissive color film 42 is provided. Thus, as compared with a case where the color film 42 is higher in light transmittance than the color film 41 or a case where the region 322 is larger in area than the region 321, it is possible to increase the amount of light passing through the timepiece dial 20 as a whole, which makes it possible to increase the amount of electric power generated by the solar panel.

The indicator ring 51 serving as a decoration member is provided so as to extend across the second transmissive color film 42 provided in the second sub-dial 22 and the first transmissive color film 41. This makes it possible to conceal the boundary line along the outer periphery of the second sub-dial 22, which makes it possible to improve the appearance of the timepiece dial 20.

In addition, when a space exists between the second transmissive color film 42 provided in the second sub-dial 22 and the first transmissive color film 41 provided around the periphery of the second transmissive color film 42 due to an accuracy error at the time of paint application of the first transmissive color film 41 and the second transmissive color film 42, this space portion can be concealed by the indicator ring 51.

Second Embodiment

Figure 6:
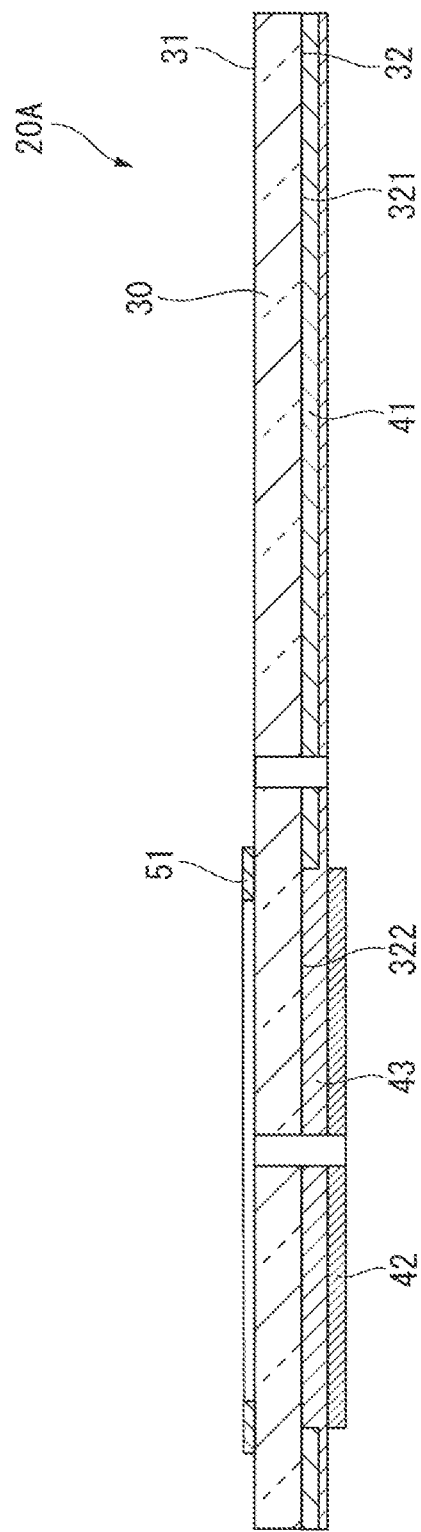
FIG. 6 is a cross-sectional view illustrating a timepiece dial according to a second embodiment.

Next, a timepiece dial 20A according to a second embodiment will be described with reference to FIG. 6.

The timepiece dial 20A is configured by: applying the first transmissive color film 41; peeling off the second mask member 62 to remove it; applying a transparent resin layer 43 across the entire back surface 32; then, providing the first mask member 61 of the mask 60; and applying the second transmissive color film 42.

Thus, in the first region 321 of the timepiece dial 20, the first transmissive color film 41 and the transparent resin layer 43 are stacked sequentially from the substrate 30. In the second region 322, the transparent resin layer 43 and the second transmissive color film 42 are stacked sequentially from the substrate 30.

Furthermore, at the time of applying the transparent resin layer 43 across the entire back surface 32, the first transmissive color film 41 is applied on the first region 321, and is not applied on the second region 322. Thus, the film thickness of the transparent resin layer 43 of the second region 322 is greater than the transparent resin layer 43 of the first region 321, and the front surface of the transparent resin layer 43, in other words, a surface opposed to the solar panel is configured to be flat surface.

With the timepiece dial 20A according to the second embodiment, it is possible to obtain operation and effects similar to those of the first embodiment. In addition, even when a portion of the adhesive of the second mask member 62 is left on the substrate 30 at the time of peeling off the second mask member 62 to remove it, the transparent resin layer 43 is applied and the second transmissive color film 42 is applied at the back surface side of the transparent resin layer 43. This makes it possible to prevent the adhesive left on the back surface 32 from being noticeable.

Third Embodiment

Next, a timepiece dial 20B according to a third embodiment will be described with reference to FIGS. 7 and 8.

The timepiece dial 20B is configured such that a reflecting plate 70 is added at the back surface side of the first transmissive color film 41.

Figure 7:
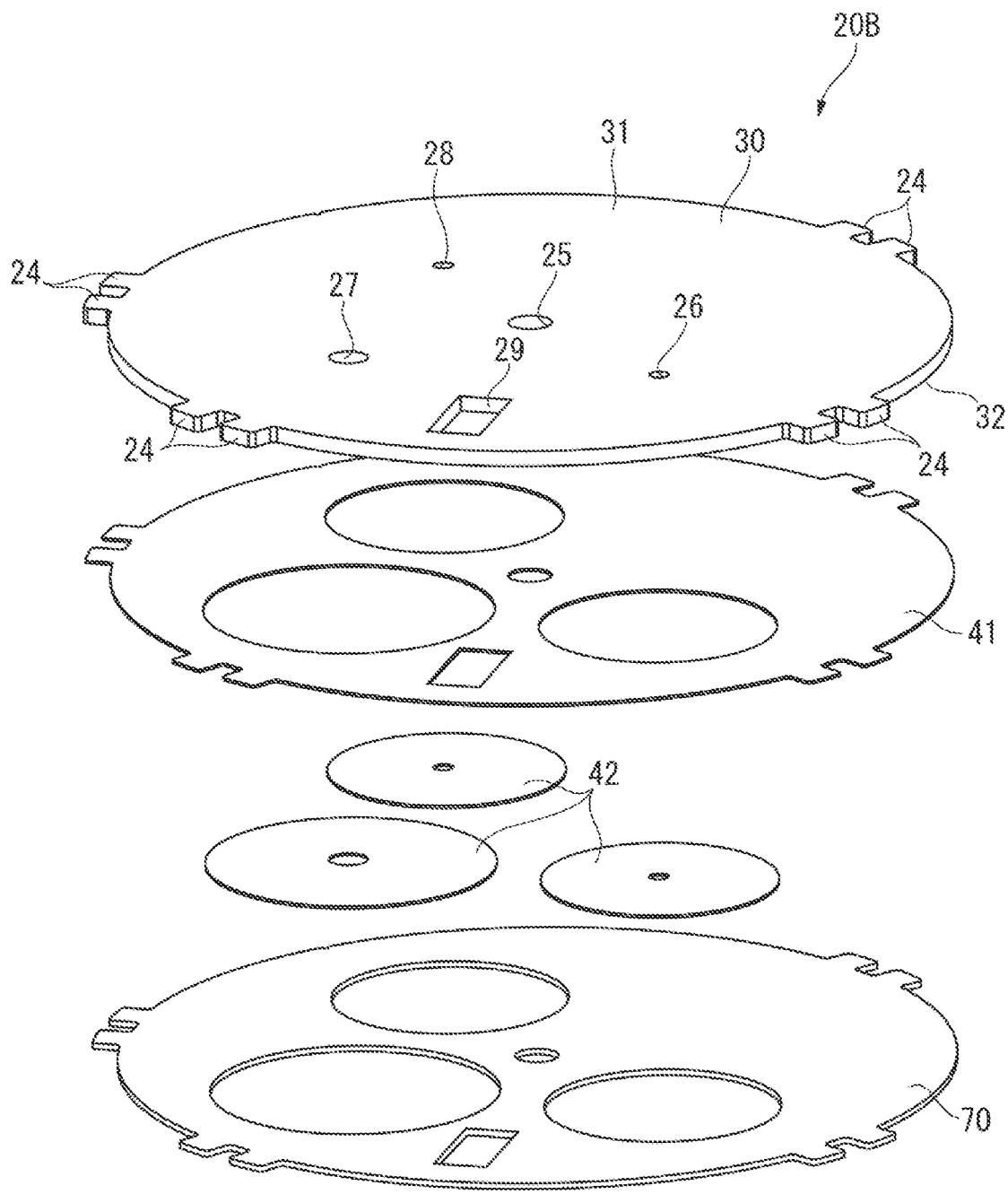
FIG. 7 is an exploded perspective view illustrating a timepiece dial according to a third embodiment.
Figure 8:
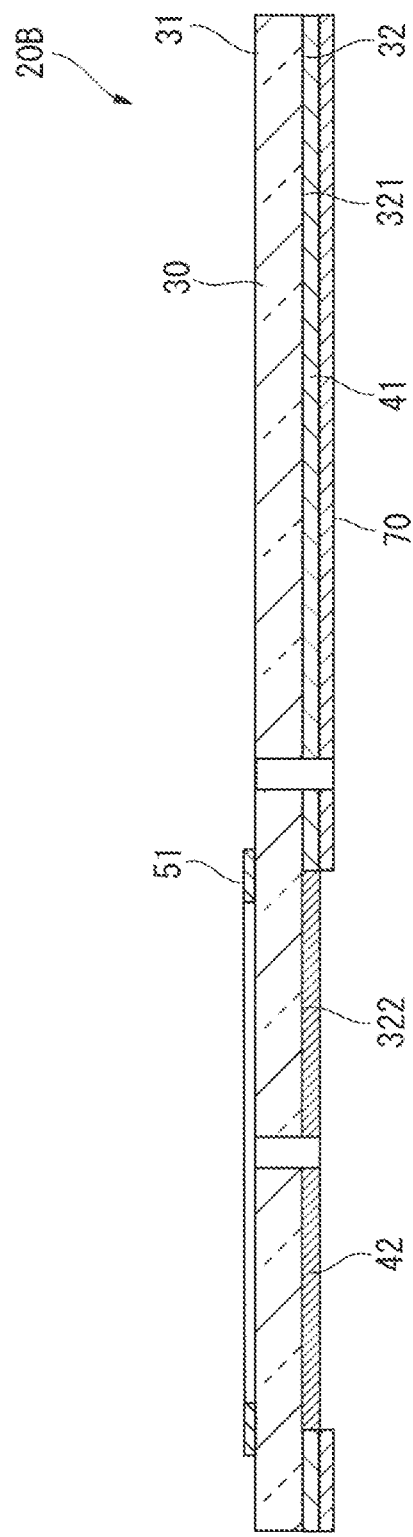
FIG. 8 is a cross-sectional view illustrating the timepiece dial according to the third embodiment.

The timepiece dial 20B includes the substrate 30, the first transmissive color film 41, the second transmissive color film 42, and the indicator ring 51 that are the same as those in the first embodiment, as illustrated in FIGS. 7 and 8.

The reflecting plate 70 is provided at the back surface side of the first transmissive color film 41.

The reflecting plate 70 is a half mirror configured to reflect part of light and allow part of light to pass through. In addition, the reflecting plate 70 is disposed in regions except for portions of the sub-dials 21, 22, and 23, the through holes 25, 26, 27, and 28 into which hand shafts are inserted, and a portion of the date window 29, in other words, is disposed at the back surface side of the first transmissive color film 41. Thus, the reflecting plate 70 reflects part of light that has passed through the substrate 30 and the first transmissive color film 41.

With the timepiece dial 20B according to the third embodiment, it is possible to achieve operation and effects similar to those in the first embodiment. In addition, since the reflecting plate 70 is provided, the light reflected by the reflecting plate 70 passes through the first transmissive color film 41 and the substrate 30, and reaches a user who visually recognizes the timepiece dial 20. This enables the user to view the color of the first transmissive color film 41 in a dense and vivid manner. In particular, since the first transmissive color film 41 is colored white, it is possible to make the white color brighter.

In addition, since the reflecting plate 70 is not provided at the back surface side of the second transmissive color film 42, the reflected light from the reflecting plate 70 does not reach the second transmissive color film 42. This makes it possible to achieve deep black color while securing the light transmittance of the second transmissive color film 42.

OTHER EMBODIMENTS

Note that the present disclosure is not limited to each of the embodiments described above. Any modification or improvement or the like should be included in the present disclosure, provided that the modification and the improvement are able to achieve the object of the present disclosure.

For example, in each of the embodiments, the first transmissive color film 41 and the second transmissive color film 42 are provided at the back surface 32 side of the substrate 30. However, as with the timepiece dial 20C in FIG. 9, the first transmissive color film 41 and the second transmissive color film 42 may be provided at the front surface 31 side of the substrate 30.

In this case, the indicator ring 51 is only necessary to be glued on the front surfaces of the first transmissive color film 41 and the second transmissive color film 42.

Figure 9:
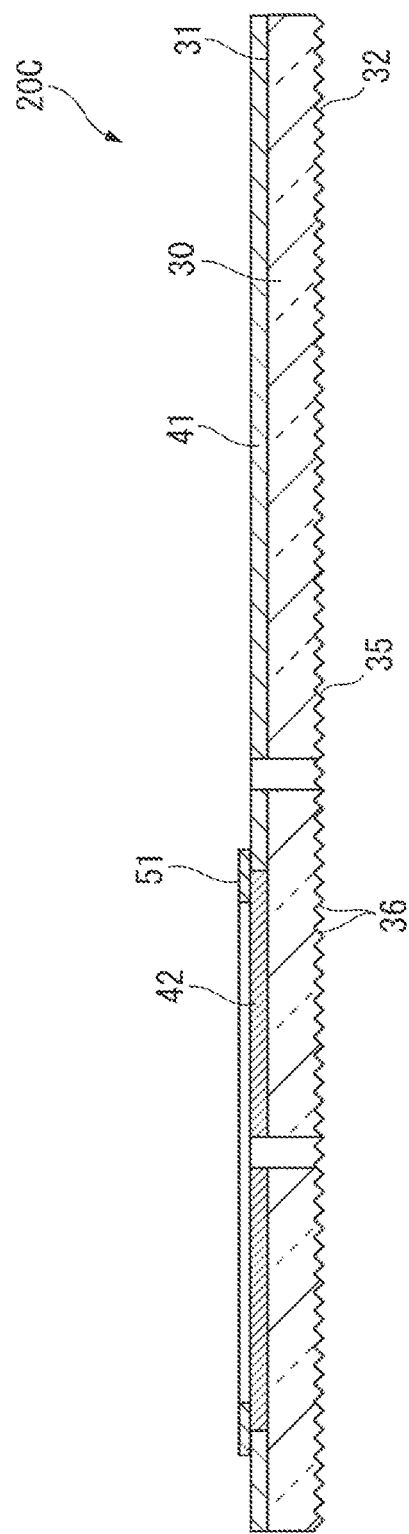
FIG. 9 is a cross-sectional view illustrating a timepiece dial according to a modification example.

Furthermore, as illustrated in FIG. 9, when the first transmissive color film 41 and the second transmissive color film 42 are provided at the front surface 31 of the substrate 30, a reflection surface 35 may be formed at the back surface 32.

The reflection surface 35 is comprised of a prism 36. The prism 36 is a stripe-shaped prism having two sloped surfaces. Note that the prism that constitutes the reflection surface 35 is not limited to a stripe-shaped prism, and may be a prism having any geometric shape or the like. That is, it is only necessary that the reflection surface 35 is a surface that allows part of light entering from the front surface 31 side of the substrate 30 to directly pass through and be caused to enter the solar panel while reflecting part of the light toward the front surface 31 side.

In addition, the reflection surface 35 may be provided only in a region that overlaps in plan view with the first region 321 where the first transmissive color film 41 having light transmittance higher than the second transmissive color film 42 is provided.

Furthermore, when the first transmissive color film 41 and the second transmissive color film 42 are provided at the front surface 31 of the substrate 30, a transparent protection layer may be provided at the front surface of the first transmissive color film 41 and the second transmissive color film 42. By providing this transparent protection layer, it is possible to make remnants of the adhesive of the mask member less noticeable.

Furthermore, in the embodiments described above, the first transmissive color film 41 is set to have a white color, and the second transmissive color film 42 is set to have a black color. However, it may be possible to select colors of each of the color films 41 and 42 on an as-necessary basis. That is, it is only necessary to spray paints with various types of color tones in a state where the first mask member 61 or the second mask member 62 is provided. Thus, it is possible to manufacture the timepiece dial 20 having various designs.

In addition, it may be possible to disperse micro powders made of pearl, shell, mica, titanium metal, silicon oxide, or the like within each of the color films 41 and 42. By the micro powder contained in the color films 41 and 42, it is possible to create a lustrous finish shining with the powder, which makes it possible to manufacture the timepiece dial 20 with highly decorative finish.

That is, the first transmissive color film 41 and the second transmissive color film 42 are not limited to those having different color tones, and may be films that are distinguishable on the basis of a presence or absence of the micro powder. It is only necessary that the first transmissive color film 41 and the second transmissive color film 42 are configured so as to be able to be distinguished by a user who visually recognizes the timepiece dial.

In the embodiments described above, the first transmissive color film 41 and the second transmissive color film 42 have substantially the same film thickness. However, these films may have different thicknesses. In particular, it is preferable that the thickness of the second transmissive color film 42 having the light transmittance lower than the first transmissive color film 41 is set to be smaller than the thickness of the first transmissive color film 41. This makes it possible to increase the amount of light that passes through the second transmissive color film 42 and also to increase the amount of light that passes through the timepiece dial and reaches the solar panel, which makes it possible to increase the amount of electric power generated.

The timepiece dial is not limited to a dial including three sub-dials 21, 22, and 23 as in each of the embodiments described above. The timepiece dial may be a timepiece dial having sub-dials of which number differs, or may be a timepiece dial having no sub-dial. For example, the timepiece dial having no sub-dial may be a timepiece dial that includes a first transmissive color film provided in the central region of the timepiece dial, and a second transmissive color film provided in a peripheral region outside of the central region of the timepiece dial. For example, a rotary shaft for the hour hand and the minute hand exists at the central portion of the timepiece dial, and the central region can be formed in a portion that overlaps with the rotation path of the hour hand in plan view of the dial. By providing the peripheral region outside of the central region that overlaps with the rotation path of the hour hand, it is possible to apply the timepiece dial to a simplified two-hand type timepiece that indicates hour and minute. Note that it is possible to add the second hand shaft at the central portion, and apply the timepiece dial to a three-hand type timepiece.

Furthermore, it may be possible to provide two or more types of transmissive color films at the timepiece dial to form letters or design. Thus, the number of types of a transmissive color film provided at the timepiece dial is not limited to two types, and it may be possible to provide three or more types of transmissive color films.

Furthermore, in the timepiece dial 20, 20A, 20B according to each of the embodiments described above, the indicator ring 51 is provided only at a portion of the second sub-dial 22. However, it may be possible to employ a configuration in which an indicator ring is also provided at the first sub-dial 21 or the third sub-dial 23 to cover the boundary portion between the first transmissive color film 41 and the second transmissive color film 42. Alternatively, a timepiece dial having no indicator ring may be possible.

SUMMARY OF PRESENT DISCLOSURE

The timepiece dial according to the present disclosure includes a substrate having transmissivity and two or more types of transmissive color films provided at one surface of the substrate. The two or more types of transmissive color films do not overlap with each other in plan view as viewed from a direction perpendicular to the one surface of the substrate.

Since the timepiece dial includes two or more types of transmissive color films at the one surface of the substrate having transmissivity, it is possible to improve the design. In addition, since the individual transmissive color films are provided so as not to overlap with each other in plan view of the substrate, it is possible to improve the optical transparency as compared with a case where the color films are provided so as to overlap with each other. Furthermore, since the individual color films do not overlap with each other, it is possible to prevent colors from overlapping with other and resulting in an interference color. This makes it possible to reproduce a desired color tone. Yet furthermore, as individual color films do not overlap with each other, it is possible to sharpen the boundary of color separation.

In the timepiece dial according to the present disclosure, a sub-dial is provided at the substrate, and the two or more types of transmissive color films include a first transmissive color film provided in a region other than the sub-dial, and a second transmissive color film provided in a region of the sub-dial.

Since the first transmissive color film is provided in a region other than the sub-dial, and the second transmissive color film is provided in a region of the sub-dial, it is possible to increase the range of decoration variation in keeping with the design of the timepiece dial having the sub-dial.

In the timepiece dial according to the present disclosure, the two or more types of transmissive color films include a first transmissive color film provided in a central region of the substrate, and a second transmissive color film provided in a peripheral region outside of the central region of the substrate.

Due to the design that can be easily applied to a timepiece dial having no sub-dial, it is possible to increase the range of decoration variation of a three-hand timepiece in which an hour hand, a minute hand, and a second hand are attached to a hand shaft provided at the center of the flat surface of the timepiece dial.

In the timepiece dial according to the present disclosure, the two or more types of transmissive color films have colors that differ from each other.

A plurality of colors can be added to the dial, and it is possible to improve the design of the dial.

In the timepiece according to the present disclosure, the two or more types of transmissive color films include a first transmissive color film and a second transmissive color film. The light transmittance of the first transmissive color film is higher than the light transmittance of the second transmissive color film, and the area of the first transmissive color film is greater than the area of the second transmissive color film.

Since the area of the first transmissive color film having light transmittance higher than that of the second transmissive color film is larger than that of the second transmissive color film, it is possible to increase the amount of light that passes through the timepiece dial as compared with an opposite case where the area of the second transmissive color film is larger, and also increase the amount of electric power generated by a solar cell.

In the timepiece dial according to the present disclosure, the two or more types of transmissive color films include a first transmissive color film and a second transmissive color film. The light transmittance of the first transmissive color film is higher than the light transmittance of the second transmissive color film, and the thickness of the second transmissive color film is smaller than the thickness of the first transmissive color film.

Since the thickness of the second transmissive color film having a light transmittance lower than that of the first transmissive color film is set so as to be smaller than that of the first transmissive color film, it is possible to increase the amount of light that passes through the second transmissive color film having a lower light transmittance, and to increase the amount of light that passes through the timepiece dial, which makes it possible to increase the amount of electric power generated by the solar cell.

The timepiece dial according to the present disclosure includes a decoration member disposed so as to extend across the two types of transmissive color films in plan view.

By providing a decoration member that extends over the two types of transmissive color films, for example, by providing an indicator ring, it is possible to use the decoration member to cover the boundary line between the individual transmissive color films, which makes it possible to improve the appearance of the timepiece dial.

In the timepiece dial according to the present disclosure, the one surface is a front surface of the substrate, and a reflection surface that reflects part of light entering from the front surface is provided at a back surface of the substrate.

Since part of the light can be reflected by the reflection surface, it is possible to make the color of the transmissive color film viewed in a dense and vivid manner.

In the timepiece dial according to the present disclosure, the one surface is a front surface of the substrate; the two or more types of transmissive color films include a first transmissive color film and a second transmissive color film; the light transmittance of the first transmissive color film is higher than the light transmittance of the second transmissive color film; and a reflection surface that reflects part of light entering from the front surface is provided at a back surface of the substrate that overlaps with the first transmissive color film in plan view.

Since light reflected by the reflection surface enters the first transmissive color film, it is possible to make the color of the first transmissive color film viewed in a dense and vivid manner.

In addition, since the reflection surface is not provided at a back surface of the second transmissive color film having the light transmittance lower than that of the first transmissive color film, it is possible to increase the amount of electric power generated by the solar panel, as compared with a case where the reflection surface is also provided at a back surface of the second transmissive color film.

In the timepiece dial according to the present disclosure, the one surface is a back surface of the substrate; the two or more types of transmissive color films include a first transmissive color film and a second transmissive color film; and a transparent layer is provided between the back surface of the substrate and the second transmissive color film.

A transparent layer made, for example, of resin is provided between the back surface of the substrate and the second transmissive color film. Thus, at the time of peeling off and removing a second mask member that covers a region on which the second transmissive color film is applied when the first transmissive color film 41 is applied, an adhesive of the second mask member that is left on the back surface of the substrate can be made less noticeable.

In the timepiece dial according to the present disclosure, the one surface is a front surface of the substrate, the two or more types of transmissive color films include a first transmissive color film and a second transmissive color film, and a transparent protection layer is provided at a front surface of the first transmissive color film and a front surface of the second transmissive color film.

With the transparent layer, it is possible to make remnants of the adhesive of the mask member less noticeable.

In the timepiece dial according to the present disclosure, a micro powder is dispersed in at least one type of the transmissive color films.

Since a micro powder made of pearl, shell, mica, titanium metal, silicon oxide, or the like is dispersed within the transmissive color film, it is possible to present a lustrous finish shining with the powder, which makes it possible to provide an external appearance of the timepiece dial with highly decorative finish.

The timepiece dial according to the present disclosure includes a reflecting plate that is opposed to a back surface of the substrate, in which the two or more types of transmissive color films include a first transmissive color film and a second transmissive color film; the light transmittance of the first transmissive color film is higher than the light transmittance of the second transmissive color film; and the reflecting plate is provided in a region that overlaps with the first transmissive color film in plan view, and is not provided in a region that overlaps with the second transmissive color film.

Since light reflected by the reflecting plate enters the first transmissive color film, it is possible to make the color of the first transmissive color film viewed in a dense and vivid manner.

In addition, the reflecting plate is not provided at the back surface of the second transmissive color film having a light transmittance lower than that of the first transmissive color film. Thus, as compared with a case where the reflecting plate is also provided at the back surface of the second transmissive color film, it is possible to increase the light that passes through the timepiece dial, which makes it possible to increase the amount of electric power generated by the solar panel.

A method of manufacturing a timepiece dial according to the present disclosure includes: placing a second mask member in a second region of one surface of a substrate having transmissivity; forming a first transmissive color film in a first region other than the second region of the one surface; removing the second mask member from the substrate; placing a first mask member on the first transmissive color film; forming a second transmissive color film in the second region; and removing the first mask member from the first transmissive color film.

Since, by using the first mask member and the second mask member, the first region and the second region can be independently concealed, it is possible to easily apply the first transmissive color film and the second transmissive color film using spray.

A timepiece according to the present disclosure includes the timepiece dial and a solar panel disposed at a back surface side of the timepiece dial.

Since the timepiece employs the timepiece dial including two or more types of transmissive color films at the one surface of the substrate having transmissivity, it is possible to improve the design of the timepiece dial, which makes it possible to improve the design of the timepiece. In addition, since the individual transmissive color films are provided so as not to overlap with each other in plan view of the substrate, it is possible to improve optical transparency as compared with a case where the individual color films are provided so as to overlap with each other. This makes it possible to increase the amount of light entering the solar panel, which makes it possible to increase the amount of electric power generated.

What is claimed is:

1. A timepiece dial comprising:
    a substrate having transmissivity; and
    two or more types of transmissive color films provided at one surface of the substrate, each of the two or more types of transmissive color films having transmissivity; and
    a reflecting plate overlapping with a first transmissive color film of the two or more types of transmissive color films in a plan view, the first transmissive color film being sandwiched between the substrate and the reflecting plate, wherein
    the two or more types of transmissive color films do not overlap with each other in a plan view as viewed from a direction perpendicular to the one surface of the substrate, and
    the reflecting plate has a reflection property in which light, which passes through the substrate and the first transmissive color film, is partially reflected at the reflection plate to become reflected light and the reflected light passes through the first transmissive color film and the substrate.

2. The timepiece dial according to claim 1, wherein
    a sub-dial is provided at the substrate, and
    the two or more types of transmissive color films include:
        the first transmissive color film provided in a region other than the sub-dial; and
        a second transmissive color film provided in a region of the sub-dial.

3. The timepiece dial according to claim 2, wherein
    the two or more types of transmissive color films have colors that differ from each other.

4. The timepiece dial according to claim 3, wherein
    the two or more types of transmissive color films include the first transmissive color film and a second transmissive color film,
    a light transmittance of the first transmissive color film is higher than a light transmittance of the second transmissive color film, and
    an area of the first transmissive color film is larger than an area of the second transmissive color film.

5. The timepiece dial according to claim 3, wherein
    the two or more types of transmissive color films include the first transmissive color film and a second transmissive color film,
    a light transmittance of the first transmissive color film is higher than a light transmittance of the second transmissive color film, and
    a thickness of the second transmissive color film is smaller than a thickness of the first transmissive color film.

6. The timepiece dial according to claim 3, including:
    a decoration member disposed so as to extend across the two or more types of transmissive color films in the plan view.

7. The timepiece dial according to claim 2, wherein
    the two or more types of transmissive color films include the first transmissive color film and a second transmissive color film,
    a light transmittance of the first transmissive color film is higher than a light transmittance of the second transmissive color film, and
    an area of the first transmissive color film is larger than an area of the second transmissive color film.

8. The timepiece dial according to claim 2, wherein
    the two or more types of transmissive color films include the first transmissive color film and a second transmissive color film,
    a light transmittance of the first transmissive color film is higher than a light transmittance of the second transmissive color film, and
    a thickness of the second transmissive color film is smaller than a thickness of the first transmissive color film.

9. The timepiece dial according to claim 2, including:
    a decoration member disposed so as to extend across the two or more types of transmissive color films in the plan view.

10. The timepiece dial according to claim 1, wherein
    the two or more types of transmissive color films include:
        the first transmissive color film provided in a central region of the substrate; and
        a second transmissive color film provided in a peripheral region outside of the central region of the substrate.

11. The timepiece dial according to claim 10, wherein
    the two or more types of transmissive color films have colors that differ from each other.

12. The timepiece dial according to claim 1, wherein
    the two or more types of transmissive color films include the first transmissive color film and a second transmissive color film,
    a light transmittance of the first transmissive color film is higher than a light transmittance of the second transmissive color film, and
    an area of the first transmissive color film is larger than an area of the second transmissive color film.

13. The timepiece dial according to claim 1, wherein
the two or more types of transmissive color films include the first transmissive color film and a second transmissive color film,
a light transmittance of the first transmissive color film is higher than a light transmittance of the second transmissive color film, and
a thickness of the second transmissive color film is smaller than a thickness of the first transmissive color film.

14. The timepiece dial according to claim 1, including:
a decoration member disposed so as to extend across the two or more types of transmissive color films in the plan view.

15. The timepiece dial according to claim 1, wherein
the one surface is a back surface of the substrate,
the two or more types of transmissive color films include the first transmissive color film and a second transmissive color film, and
a transparent layer is provided between the back surface of the substrate and the second transmissive color film.

16. A timepiece comprising:
the timepiece dial according to claim 1, and
a solar panel disposed at a back surface side of the timepiece dial.

17. A timepiece dial comprising:
a substrate having transmissivity;
two or more types of transmissive color films provided at one surface of the substrate, each of the two or more types of transmissive color films having transmissivity; and
a reflecting plate that is opposed to a back surface of the substrate, wherein
the two or more types of transmissive color films do not overlap with each other in a plan view as viewed from a direction perpendicular to the one surface of the substrate,
the two or more types of transmissive color films include a first transmissive color film and a second transmissive color film,
a light transmittance of the first transmissive color film is higher than a light transmittance of the second transmissive color film, and
the reflecting plate is provided in a region that overlaps with the first transmissive color film in the plan view, and is not provided in a region that overlaps with the second transmissive color film.

18. A timepiece comprising:
the timepiece dial according to claim 17, and
a solar panel disposed at a back surface side of the timepiece dial.

* * * * *